Nov. 13, 1928.  S. JENCICK  1,691,116

FLEXIBLE COUPLING

Filed April 29, 1920

INVENTOR
Stephen Jencick
BY Brockett & Hyde
ATTORNEYS

Patented Nov. 13, 1928.

1,691,116

UNITED STATES PATENT OFFICE.

STEPHEN JENCICK, OF CLEVELAND, OHIO.

FLEXIBLE COUPLING.

Application filed April 29, 1920. Serial No. 377,623.

This invention relates to flexible couplings, such as are used for connecting two shaft members where some freedom of movement between said shaft members is required.

The object of the invention is to provide an improved coupling which is stronger and more durable than prior couplings for the same purpose, but which can be constructed without increase in cost. A further object of the invention is to provide a flexible coupling member, the construction of which enables increased torsional effect to be obtained without diminution in the flexibility, the modification or variation in structure of said coupling, as distinguished from prior constructions for the same purpose, being of simple form and capable of use at low cost.

Further objects of the invention are in part obvious and in part will appear more in detail hereinafter.

The invention comprises the construction and arrangement of parts hereafter described and claimed.

Figure 1:
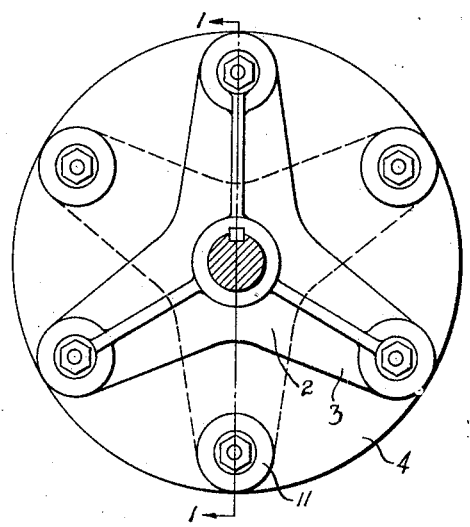
Figure 2:
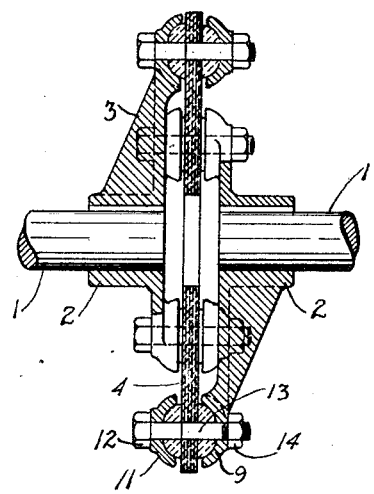
Figure 3:
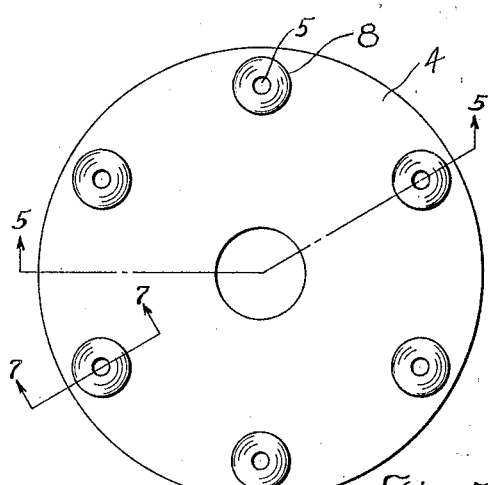
Figure 4:
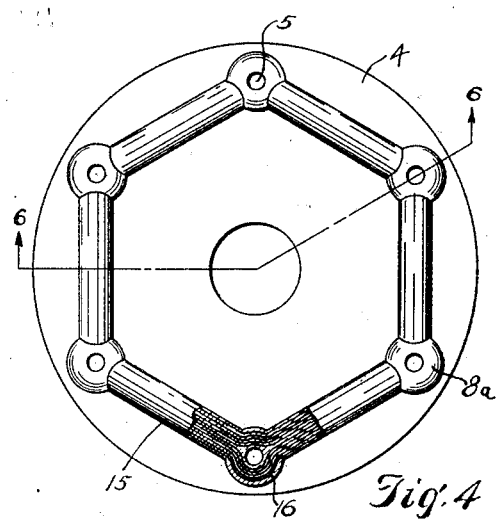
Figure 5:
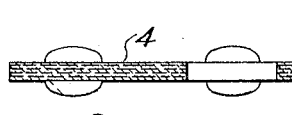
Figure 6:
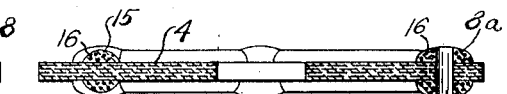

In the drawings, Fig. 1 represents an end view illustrating one form of coupling embodying the invention; Fig. 2 is a section on the line 1—1, Fig. 1; Fig. 3 is a face view of the flexible coupling member; Fig. 4 is a similar view, illustrating a modification; Fig. 5 is a section on the line 5—5, Fig. 3; Fig. 6 is a section on the line 6—6, Fig. 4; and Fig. 7 is a detail section on the line 7—7, Fig. 3.

One common form of coupling member embodies a disc of composition material, such as several layers of canvas or other fabric embedded in rubber, said disc lying transverse to the axis of the shaft members to be connected and being coupled therewith by (for example) three arms, the connections of the arms on one face being in staggered or alternate relation to the connections of the arms on the other face. In such couplings it is the custom to fasten the disc to the arms by bolts, beneath the heads and nuts of which are located fairly large washers. Such washers are necessary to confine the composition or disc material adjacent to the bolts and prevent the bolts from shearing through, but said washers are also objectionable because they reduce and limit the flexibility of the disc to bending action of the material lying between adjacent pairs of washers.

The present invention aims to relatively increase the strength of the coupling and at the same time avoid reduction in its flexibility. The coupling shown in the drawings is adapted for connecting two shaft members 1, each of which is provided with a frame member 2 rotatable therewith and provided with any suitable number, say three, of arms 3. Between the two shaft members is located the coupling disc or member 4, pierced with six openings 5, one for each of said arms, the arms on the two faces of the disc being in alternate arrangement.

Figure 7:
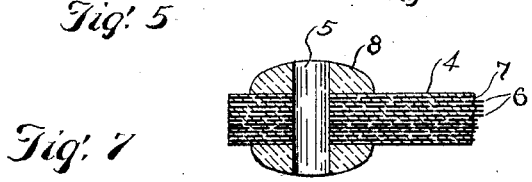

Disc 4, as shown in Fig. 7, is made up of a series of layers or plies 6 of canvas or other fabric embedded in a body 7 of rubber or like flexible material. On each side of said disc and surrounding the openings 5 therethrough are provided mounds or projections 8 of rubber or like composition material. These mounds may be semi-spherical or somewhat flattened as shown. The openings 5 in any given size of coupling member will be smaller than those usually provided for this purpose, thereby reducing the size of the bolts, which, in the present form of coupling, are usually larger than necessary for the torsional effect. Each arm 3 terminates in or is provided with a cup or socket member 9 shaped to fit the corresponding mound or projection 8, and on that side of the disc 4 opposite to each of said socket members is a similarly shaped cup washer 11. The outer surfaces of said cups 9 and washers 11 may be flattened to provide bearing surfaces for the head 12 of the bolt 13 and the nut 14 screwed thereto.

This arrangement materially increases the strength of the coupling. The bearing area of each bolt in its opening is increased by the thickness of the mound or projection. Furthermore, the mounds or projections are securely clamped between the cups and washers so that before the bolt shears through the body of the disc it must also in effect shear off the pair of mounds from the two faces of the disc. At the same time, viewing the disc in elevation, as in Fig. 3, the diameter of each mound may be less that the diameter of the flat washers usually employed in such constructions, which therefore increases the free or exposed area of the disc between adjacent washers. The coupling member as a whole is therefore more flexible or can be bent with greater angularity between the two shaft members than couplings ordinarily provided for this purpose.

Figs. 4 and 6 illustrate a modification in which the mounds 8ᵃ surrounding the bolt openings are connected by circumferentially extending tying ribs or bands 15 which reinforce the areas between adjacent bolts. This disc may be further reinforced by including in the material of the mounds and ribs cords or strands such as are used in the manufacture of cord tires, such strands being illustrated at 16. These strands may be laid or arranged upon a form so as to properly place them on the side of the rubber disc, after which rubber is built up upon and incorporated between the adjacent fibres, the entire built up mass being held in clamps and vulcanized in the ordinary manner. The cups and washers on the ends of the frame arms are, of course, suitably shaped to conform to the configuration of the mounds and ribs. When this disc, provided with its mounds and ribs before described, is clamped or held between the cups and washers, the mounds and ribs together with the cords incorporated therein, are firmly clamped to the disc and in effect are anchored thereto at or adjacent to each of the bolt openings. Therefore, each adjacent pair of bolts is not only connected by a portion of the disc but also by the rib 15 and the reinforcing cords 16 therein.

What I claim is:

1. A coupling member, comprising a disc of flexible material provided on one face with circumferentially extending reinforcing ribs.

2. A coupling member, comprising a disc of flexible material provided on one face with circumferentially extending reinforcing ribs, and reinforcing strands therein.

3. A coupling member, comprising a disc of flexible material provided with circumferentially spaced projections, and ribs connecting the same.

4. A coupling member, comprising a disc of flexible material provided with circumferentially spaced projections, ribs connecting the same, and reinforcing strands in said projections and ribs.

5. A coupling member, comprising a disc of flexible material provided on opposite faces with circumferentially extending reinforcing ribs.

6. A coupling member, comprising a disc of flexible material provided on opposite faces with circumferentially extending reinforcing ribs, and reinforcing strands therein.

7. A flexible disc having a body portion of vulcanizable material, and a series of links at the periphery of the body portion and secured thereto by vulcanization.

In testimony whereof I affix my signature.

STEPHEN JENCICK.